United States Patent [19]

Eakman et al.

[11] 4,149,864

[45] Apr. 17, 1979

[54] SEPARATION OF CARBON DIOXIDE AND OTHER ACID GAS COMPONENTS FROM HYDROCARBON FEEDS

[75] Inventors: James M. Eakman, Houston, Tex.; Harry A. Marshall, Madison, N.J.

[73] Assignee: Exxon Research & Engineering Co., Florham Park, N.J.

[21] Appl. No.: 833,937

[22] Filed: Sep. 16, 1977

Related U.S. Application Data

[63] Continuation-in-part of Ser. No. 619,472, Oct. 3, 1975, abandoned.

[51] Int. Cl.² .............................................. F25J 34/02
[52] U.S. Cl. ............................................ 62/11; 62/28
[58] Field of Search .......................... 62/23, 27, 28, 11

[56] References Cited

U.S. PATENT DOCUMENTS

| | | | |
|---|---|---|---|
| 3,001,373 | 9/1961 | Eastman et al. | 62/28 |
| 3,469,410 | 9/1969 | Schramm et al. | 62/28 |
| 3,498,067 | 3/1970 | Ranke | 62/28 |
| 3,508,413 | 4/1970 | Pryor | 62/28 |
| 3,618,331 | 11/1971 | Smith et al. | 62/28 |
| 3,740,204 | 6/1973 | Slater et al. | 62/28 |

OTHER PUBLICATIONS

Proceedings of the 53rd Annual Convention, Mar. 25–27, 1974 at Denver, Colorado, pp. 171–177, Gas Processors Association.

*Primary Examiner*—Norman Yudkoff
*Attorney, Agent, or Firm*—L. A. Proctor; Wayne Hoover

[57] ABSTRACT

A process for the separation of carbon dioxide and, optionally, other acid gas components in a distillation column, operated at high pressure and low temperature, from a gaseous mixture comprising one or more hydrocarbons, including particularly methane, and hydrogen. In its preferred aspects, the feed is predominantly methane, suitably from about 30 to about 85 mole percent and preferably from about 50 to about 80 mole percent methane. The concentration of hydrogen in the gaseous mixture will be sufficient to provide from about 6 to about 34 mole percent, preferably from about 15 to about 25 mole percent hydrogen in the rectification portion of the distillation column. The separation can be effected in a single column usually having from about 20 to about 30 theoretical distillation stages and the feed can be one constituted ab initio within the desired ranges of composition, or modified by addition of components just prior to or at the time of distillation.

10 Claims, 3 Drawing Figures

UPPER STAGE TEMPERATURE-COMPOSITION PROFILES
1025 psia

SEPARATION OF CARBON DIOXIDE AND OTHER ACID GAS COMPONENTS FROM HYDROCARBON FEEDS

CROSS-REFERENCE TO RELATED APPLICATIONS

This application is a continuation-in-part of copending application Ser. No. 619,472 filed Oct. 3, 1975 in the name of the same inventors as are named herein and now abandoned.

BACKGROUND OF THE INVENTION

Gaseous hydrocarbons, particularly those produced in industrial operations, are characterized generally as admixtures of hydrocarbons in varying concentration, inclusive of nonhydrocarbon components. Many include acid gas components which must be removed. Carbon dioxide and other acid gas components such as $H_2S$, COS and $SO_2$ often occur in admixture with hydrocarbons, notably methane, as in natural gas or synthetic natural gas, and must be separated from the hydrocarbon gas prior to its commercial use, e.g., as a fuel. A process of outstanding importance in this regard requires the separation of carbon dioxide and other acid gas components from a mixture of methane and synthesis gas (an admixture of carbon monoxide and hydrogen). The separation of carbon dioxide from such mixtures is quite burdensome particularly since it is often contained within a gaseous mixture in concentrations ranging as high as 30 mole percent or greater. Removal of the carbon dioxide by scrubbing with alkaline solutions, e.g., aqueous amine solutions, is usually prohibitive when the concentration of the carbon dioxide exceeds about two or three mole percent.

The separation of components of different boiling points by distillation usually provides advantages but the separation of carbon dioxide from liquefied hydrocarbon streams is quite burdensome because carbon dioxide crystallizes, solidifies or "ices up" over a wide range of temperature and pressure conditions, which ranges often overlap or correspond to those required for most effective separation. The formation of a solid phase in a distillation column for obvious reasons is generally viewed as intolerable.

An acute disadvantage in prior art processes employing only a single distillation column for the separation of carbon dioxide from gaseous hydrocarbon streams, notably methane streams, is that distillations conducted at economically feasible conditions leaves significant amounts of the carbon dioxide present and consequently cannot be used when it becomes necessary to remove greater amounts of the carbon dioxide. For example, a cryogenic separation process utilizing a single distillation column described by J. K. Jones in Proceedings of the 43rd Annual Convention, Mar. 25-27, 1974 at Denver, Colo., Pages 171-176, suggests that the removal of carbon dioxide from methane-containing streams to provide methane which contains about 10 mole percent $CO_2$ is possible by operation at 730-750 psia at temperatures no lower than about $-100°$ F., but that further reduction of the $CO_2$ content below the 10 mole percent level would require operation close to the solid $CO_2$-vapor region, and close to the critical pressure loci (Page 176).

A process for effecting the separation of carbon dioxide from a predominantly methane stream is described in U.S. Pat. No. 2,888,807 to Phillip E. Bocquet. The separation requires the use of two distillation columns, each operated under different sets of conditions dependent on the concentration of carbon dioxide; (a) as ranging below 8 mole percent, or (b) as ranging above 8 mole percent. In each instance the first and second distillation columns, respectively, of the two different types of operation are maintained under the same operating conditions, the respective operations differing only in that the feed is introduced at different locations. Where the carbon dioxide is present in the lower concentrations, the feed is directly introduced into the first column of the series, and where the carbon dioxide is present in the higher concentrations, the feed is directly introduced into the second column of the series.

In each type of operation characterizing the Bocquet process, the first columns are operated at or below the critical temperature of methane such that feeds to a respective column provide a carbon dioxide concentration below that which, on cooling at the operating pressure of the column, would produce a solid carbon dioxide phase. Effluents from the top of the second columns contain substantially the same concentration of carbon dioxide as the feeds to said first columns. The operating pressure applied to said second columns is maintained above a critical pressure defined as that at which the carbon dioxide phase will exist, and above which pressure a solid carbon dioxide phase will not coexist with a vapor. Whereas this process has provided certain advantages over previous processes, it nonetheless possesses acute disadvantages. A notable disadvantage is that two operating columns are required to effect the separation of carbon dioxide from a predominantly methane stream. Moreover, the operation becomes particularly complex when it is required to treat methane streams of varying carbon dioxide concentration ranging above and below 8 mole percent carbon dioxide.

SUMMARY OF THE INVENTION

It is, accordingly, the primary objective of this invention to obviate these and other prior art deficiencies, particularly by providing a new and improved distillation process for the separation in a single column of acid gas components from hydrocarbon streams.

A particular object of this invention is to provide a process wherein carbon dioxide can be separated from methane gas streams by distillation, particularly one requiring the use of only a single distillation column.

A specific object of this invention is to provide a process requiring only a single distillation column for the more effective separation of carbon dioxide from gaseous methane streams, notably gaseous streams wherein methane is contained in admixture with carbon monoxide and hydrogen.

These objects and others are achieved in accordance with the present invention, characterized as a process for the separation in a single distillation column of carbon dioxide and other acid gas components by distillation from a gaseous hydrocarbon or mixture of hydrocarbons, inclusive of methane and hydrogen. The hydrogen is present in the feed stream ab initio, or added to the distillation zone to provide a hydrogen concentration ranging from about 6 to about 34 mole percent, preferably from about 20 to about 30 mole percent, within the feed stream introduced into the distillation zone. Preferably, the predominant hydrocarbon within the gaseous feed stream is methane. More preferably, the feed streams contain from about 30 to about 85 mole percent, and preferably from about 50 to about 80 mole percent methane. By distilling, or fractionating a feed stream comprising a hydrocarbon or hydrocarbon mixture of such character, in a single distillation column, at sufficiently high pressure and low temperature in the presence of sufficient hydrogen, solid carbon dioxide formation is prevented such that greater than 90 mole percent, suitably from about 95 to about 99 mole percent and higher removal of the carbon dioxide originally present in the feed stream can be effected. Suitably, pursuant to the practice of this process, the residual carbon dioxide ranges below about 10 mole percent, preferably from about 5 to about 1 mole percent and less.

DESCRIPTION OF THE PREFERRED EMBODIMENT

In its preferred embodiment, the present process makes it feasible to effect almost complete separation of carbon dioxide and other acid gas components, when present, from a methane-containing gaseous mixture, such as natural gas, synthetic natural gas, or synthesis gas, by distillation, or fractionation, in a single column at total pressures no greater than about 1073 psia, the critical pressure of carbon dioxide. Preferably, pressures ranging about 710 psia to 1070 psia, and more preferably from about 1025 psia to 1070 psia. The feed gas, prior to or at the time of introduction into the distillation or fractionation column is cooled below −45° F., preferably to temperatures ranging from about −45° F. to about −70° F. and more preferably from about −50° F. to about −55° F.

The distillation can be carried out in a single column, conventional vapor-liquid contacting apparatus. These and other features of the present process will be illustrated and consequently better understood by reference to the attached drawings, the description, illustrations and example, which makes reference to the drawings.

Figure 1:
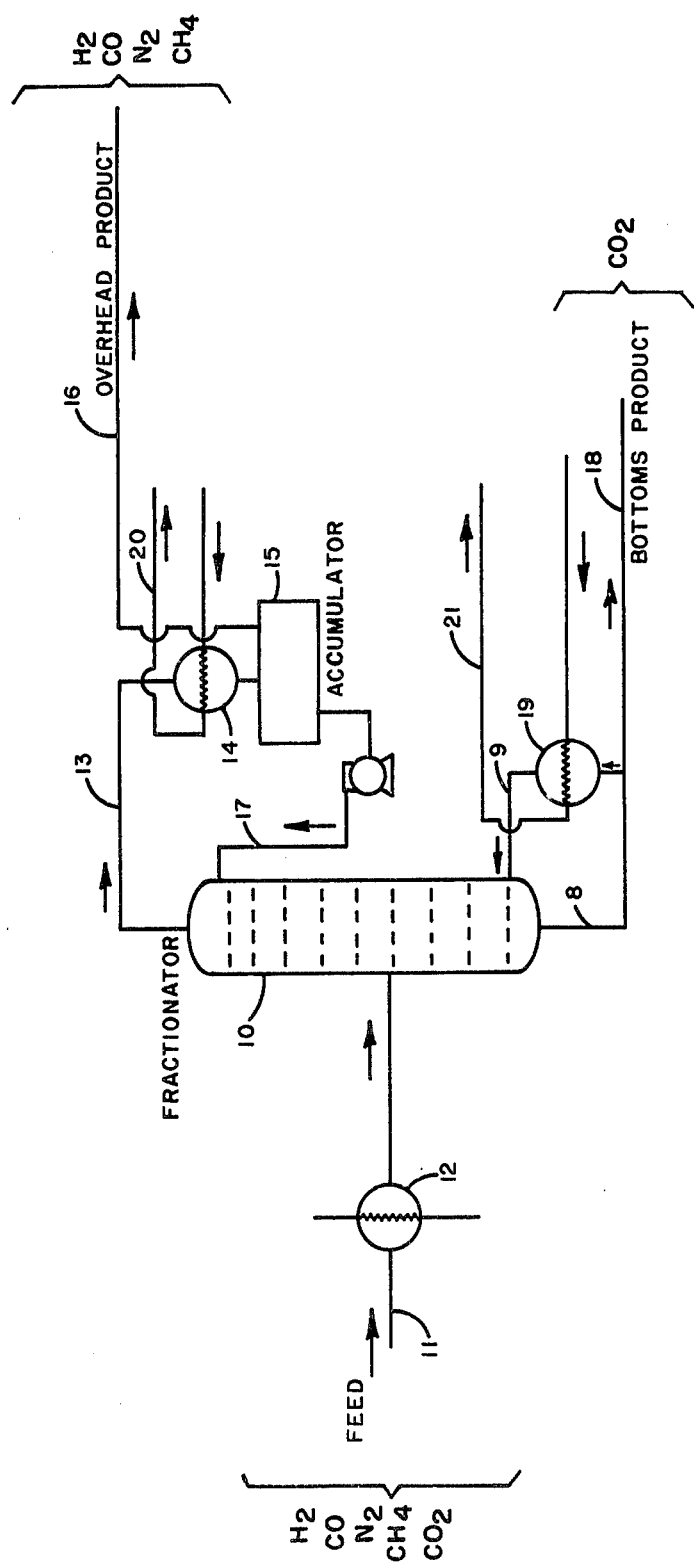
FIG. 1 depicts distillation apparatus in schematic form, and an arrangement of the apparatus and associated apparatus components adapted to carry out the present process.

Referring to FIG. 1, there is shown a fractionating column 10 of the vapor-liquid contact type constituted generally of an outer metal shell within which is provided a plurality of vertically separated bubble cap trays (not shown). A gaseous feed, after precooling by passage through a heat exchanger 12, is introduced via line 11 into about the middle of Column 10. Overhead vapors consisting primarily of methane and synthesis gas or hydrogen, since the primary function of the upper stages of the column is to reduce the quantity of carbon dioxide and other acid components leaving the top of the column, are removed via line 13. The vapors are passed through a condenser 14, which can be internal or external, but is illustrated for convenience as an external condenser. The uncondensed gas, principally methane and synthesis gas, is withdrawn from the top of accumulator 15 via line 16 and stored and liquid is withdrawn from the bottom of accumulator 15 and reintroduced via line 17 into the top of the column 10 as reflux. The required liquid: distillate reflux ratio employed is related to the number of trays employed in the column, the relative amounts of carbon dioxide, methane and hydrogen present in the feed, and to the carbon dioxide level desired in the distillate. It is set to achieve the required separation while avoiding solids formation. As will be apparent from the foregoing, effective separation, i.e., separation without the formation of solid $CO_2$, for a given feed composition and feed inlet temperature, is accomplished by controlling the total pressure on the column and the combined partial pressure of methane and carbon dioxide within the column. The total pressure can, of couse, be controlled by any of the means known to be effective for this purpose in the prior art while the combined partial pressure of methane and carbon dioxide can be controlled by controlling the amount of liquid methane returned to the column as reflux.

For a feed comprising from about 30 to about 85 mole percent methane, carbon dioxide and sufficient hydrogen to provide from about 6 to about 34 mole percent hydrogen in the gas phase throughout the rectification section of the distillation column, and which may also contain nitrogen and carbon monoxide, then effective separation will be accomplished when: (1) the total pressure, $P_T$ is greater than the value determined from the following equation:

$$P_T > \frac{705 \text{ psia}}{\left[\frac{Z_{CH_4} + \left(\frac{L}{D}\right)(Z_{CH_4} + Z_{H_2} + Z_{CO} + Z_{N_2})}{(1 + \frac{L}{D})(Z_{CH_4} + Z_{H_2} + Z_{CO} + Z_{N_2})}\right]} \qquad \text{I.}$$

wherein:
$Z_{CH_4}$ = mole fraction of methane in feed
$Z_{H_2}$ = mol fraction of hydrogen in feed
$Z_{CO}$ = mole fraction of CO in feed
$Z_{N_2}$ = mol fraction of $N_2$ in feed and
$L/D$ = the reflux ratio in mols of liquid reflux/mol of distillation vapor and (2) the total pressure is less than 1073 psia or the value determined from the following equation, whichever is the less:

$$P_T < (673 + 488 Y_{H_2} + 11{,}280 Y_{H_2}^2) \text{psia} \qquad \text{II.}$$

$$Y_{H_2} = \frac{Z_{H_2}}{(1 + \frac{L}{D})(Z_{CH_4} + Z_{H_2} + Z_{CO} + Z_{N_2})}$$

and
$Z_{CH_4}$ = mol fraction of methane in feed
$Z_{H_2}$ = mol fraction of hydrogen in feed
$Z_{CO}$ = mol fraction of CO in feed
$Z_{N_2}$ = mol fraction of $N_2$ in feed
$L/D$ = the reflux ratio in mols of liquid reflux/mol of distillation vapor As previously indicated, the values of $Z_{N_2}$ and $Z_{CO}$ may, independently be zero. Also, when these values are zero, it is believed readily apparent that the maximum total pressure will be controlled by Equation II when the hydrogen:methane ratio in the feed is less than about 0.607 and by the critical pressure of $CO_2$, about 1073 psia, when the hydrogen:methane ratio in the feed is greater than about 0.607.

Suitably, the molar ratio of liquid:distillate used as reflux ranges about 1.25:1 and greater, preferably about 1.3:1 and greater. Liquid bottoms, which consist predominantly of carbon dioxide and other acid gas components, since the function of the lower part of the distillation column 10 is to reduce the quantity of methane and synthesis gas components in the acid gas stream leaving the bottom of the column, are removed via line 18 after passage of a portion thereof through a reboiler-type heat exchanger 19. The proper heat exchange relationships are provided by a conventional refrigeration system (not shown), refrigerant being circulated via line 20 through heat exchanger 14. Heat exchange with a portion of the bottoms product is provided by passage of a portion of the bottom product via lines 8 and 9 through heat exchanger 19, shown in heat exchange relationship with a material contained in line 21. The remaining portion of the bottoms product is sent to storage or further processing via line 18.

In its preferred aspects, the fractionation is conducted at the highest total pressure below mixture critical which will allow adequate phase separation for the high purity carbon dioxide in the lower part of the column and the reboiler. The range of satisfactory operating conditions will vary to some extent dependent upon the specific composition of the feed gas of interest. For the separation of carbon dioxide from admixtures of methane ($CH_4$) and synthesis gas ($H_2+CO$) at molar ratios of $CH_4:(H_2+CO)$ of about 1:1 to about 5:1 as conducted in a preferred embodiment of this invention, the upper stages of the column are maintained at a pressure greater than about 1025 up but not exceeding 1070 psia, the critical pressure of carbon dioxide. At such pressure even with reflux temperatures well below $-100°$ F., the formation of solid carbon dioxide will not occur. Both gas and liquid phases will be present in the column at these pressures, which are well above 673 psia, the critical pressure of pure methane. A feature of this invention is that the carbon dioxide can be reduced to very low levels within a hydrogen-containing hydrocarbon product by selection of the temperature and rate of reflux liquid, as desired.

Figure 2:
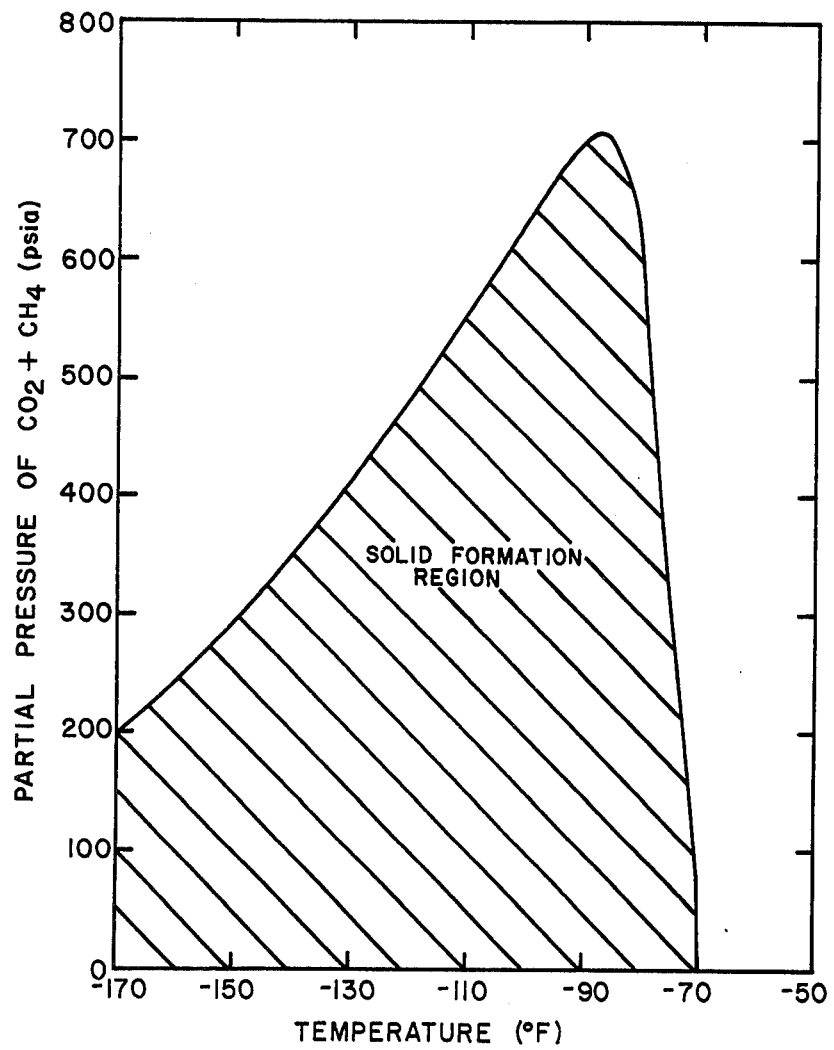
FIG. 2 depicts a diagram representative of the interrelationship between temperature and partial pressure of carbon dioxide plus methane ($CO_2 + CH_4$) wherein solid phase formation can occur, which region is avoided in operation of the column.

Referring to FIG. 2, there is graphically described an essential relationship between temperature in ° F. and the partial pressure of carbon dioxide and methane ($CO_2+CH_4$), expressed in pounds per square inch absolute, if solid formation is to be avoided in such systems. It will be observed that, in order to avoid the formation of solids operation of the column at temperatures ranging from about $-170°$ F. to about $-84°$ F. as shown on the x-axis, requires higher and higher partial pressures of carbon dioxide and methane, as shown on the y-axis, ranging from about 200 psia to about 710 psia at the higher temperature. Thereafter up to about $-70°$ F., the partial pressure that is required declines. The relationship expressed in the graph which is required to avoid the solids formation region is tabulated for convenience as follows:

| Temperature, ° F. | Partial Pressure of ($CO_2$ + $CH_4$), psia |
|---|---|
| −170 | >200 |
| −150 | >280 |
| −130 | >420 |

-continued

| Temperature, ° F. | Partial Pressure of ($CO_2$ + $CH_4$), psia |
|---|---|
| −110 | >550 |
| −90 | >700 |
| −84 | >710 |
| −70 | >75 |

Figure 3:
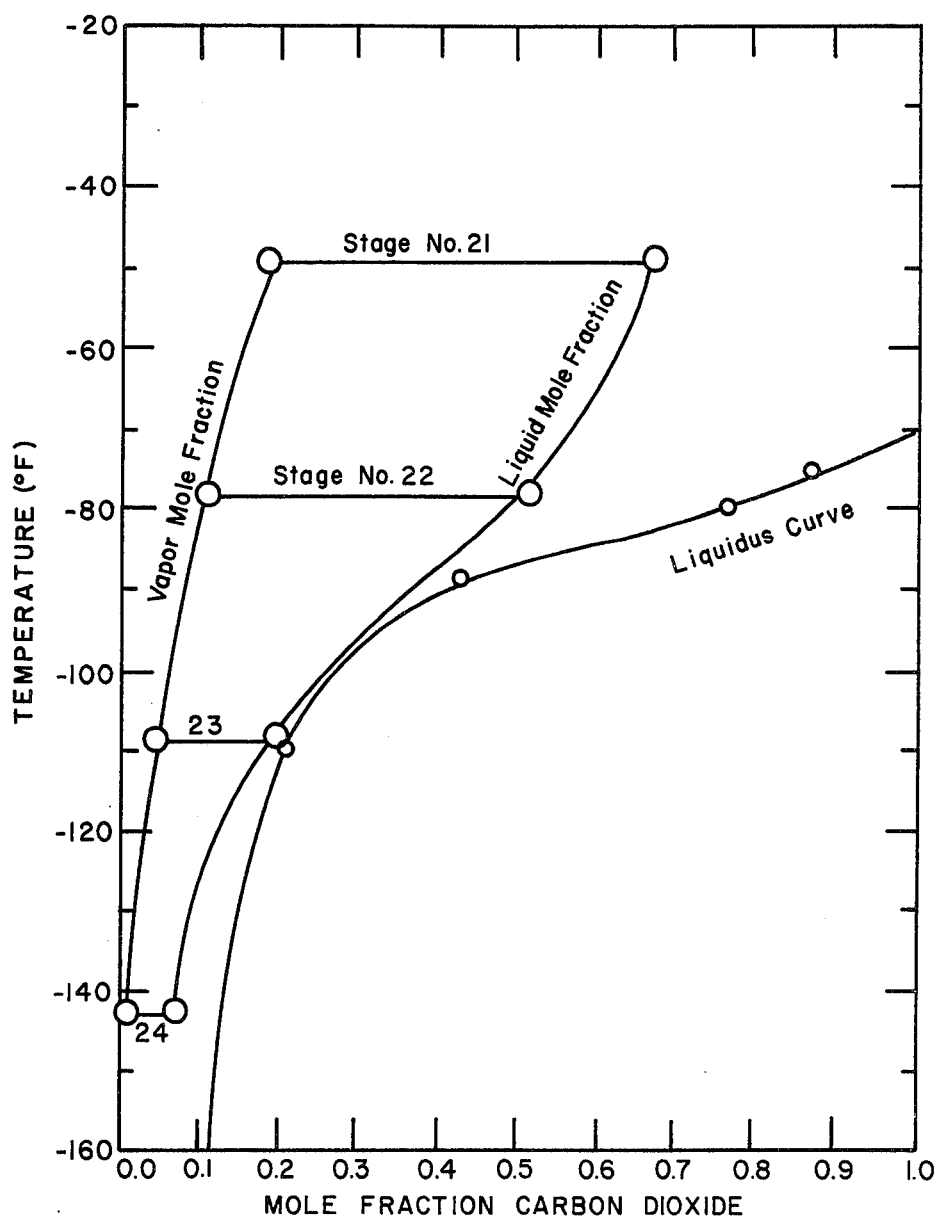
FIG. 3 depicts a diagram representative of upper stage temperature composition profiles of a multicomponent mixture containing methane, carbon dioxide, and hydrogen as exists in the upper stages of a distillation column.

In sharp contrast to prior art single column distillation processes for effecting such separations, which remove only about 90 mole percent of the carbon dioxide, it has been found feasible to remove carbon dioxide to a level of 1 mole percent, or less, in the admixture of carbon dioxide and methane, or methane in admixture with other hydrocarbons and hydrogen, e.g., methane and synthesis gas, particularly in a single column utilizing generally 20 to theoretical distillation stages. This is conveniently illustrated by reference to FIG. 3. This figure presents a diagram representative of upper stage temperature composition profiles of a multicomponent composition containing methane, carbon dioxide, and hydrogen wherein 1025 psia total pressure is maintained on the column and the column is operated by introducing the feed at a temperature of $-50.8°$ F. while employing a liquid:distillate molar ratio of 1.35 in the overhead. The data graphically illustrated in FIG. 3 are taken from a computer simulated run conducted as follows:

| | | |
|---|---|---|
| Hydrogen | 24.1 | Moles |
| Nitrogen | 0.5 | " |
| Carbon Monoxide | 6.6 | " |
| Methane | 39.4 | " |
| Carbon Dioxide | 27.8 | " |
| Ethane | 0.4 | " |
| Hydrogen Sulfide | 1.1 | " |

The overhead vapor and bottoms liquid streams are 71.1 moles and 28.9 moles, respectively. The mole fractions of the components in the two streams are:

| | Vapor Overhead | Liquid Bottoms |
|---|---|---|
| Hydrogen | 0.339 | 0.000 |
| Nitrogen | 0.007 | 0.000 |
| Carbon Monoxide | 0.093 | 0.000 |
| Methane | 0.550 | 0.010 |
| Carbon Dioxide | 0.010 | 0.937 |
| Ethane | 0.000 | 0.013 |
| Hydrogen Sulfide | 0.000 | 0.040 |

In FIG. 3, the temperature in degrees Farenheit is read on the y-axis and the mole fraction of carbon dioxide in the binary fraction is read on the x-axis. The liquids curve is representative of that region below and to the right of which curve a solid phase is formed, and above and to the left of which no solid phase is formed. The left-most curve on the scale is representative of the vapor mole fraction, the intermediate curve is representative of the liquid mole fraction, and horizontal lines drawn therebetween are representative of theoretical stages of temperature below $-70°$ F.; these ranging in number from 21 through 24+. These data show that it is possible to remove to a level of about 1 mole percent carbon dioxide present in the vapor phase mixture by use of less than 25 theoretical trays. It is particularly significant that the mole fraction of carbon dioxide in the liquid phase, at any given set of conditions does not exceed the mole fraction of carbon dioxide given by the liquids curve at corresponding conditions.

It is apparent that various modifications can be made in the process without departing from the spirit and scope of the present invention.

Having thus described and illustrated the invention, what is claimed is:

1. A process for the separation of carbon dioxide carbon monoxide, nitrogen, from a gaseous mixture comprising carbon dioxide, from about 30 to about 85 mole percent methane and sufficient hydrogen to yield from about 6 to about 34.5 mole percent hydrogen in the gas phase at all points in a distillation column above the point or points at which the gaseous mixture is introduced thereto, comprising:

(a) introducing said gaseous mixture into a distillation column at a temperature below about −45° F. but at a temperature above that at which solid carbon dioxide would be formed;
   (b) maintaining a temperature within the range from about −170° F. to about −70° F. in the upper portion of said distillation column, the total pressure within said column being greater than the value determined from the following equation:

$$P_T > \frac{705 \text{ psia}}{\left[\frac{Z_{CH4} + \left(\frac{L}{D}\right)(Z_{CH4} + Z_{H2} + Z_{CO} + Z_{N2})}{(1 + \frac{L}{D})(Z_{CH4} + Z_{H2} + Z_{CO} + Z_{N2})}\right]}$$

wherein:
$Z_{CH4}$ = mol fraction of methane in feed
$Z_{H2}$ = mol fraction of hydrogen in feed
$Z_{CO}$ = mol fraction of CO in feed
$Z_{N2}$ = mol fraction of $N_2$ in feed and
L/D = the reflux ratio in mols of liquid reflux/mol of distillation vapor:
but less than 1073 psia or the value determined from the following equation, whichever is lesser;

$$P_T < (673 + 488 Y_{H2} + 11{,}280 Y_{H2}^2) \text{psia}$$

wherein:

$$Y_{H2} = \frac{Z_{H2}}{(1 + \frac{L}{D})(Z_{CH4} + Z_{H2} + Z_{CO} + Z_{N2})}$$

and
$Z_{CH4}$ = mol fraction of methane in feed
$Z_{H2}$ = mol fraction of hydrogen in feed
$Z_{CO}$ = mol fraction of CO in feed
$Z_{N2}$ = mol fraction of $N_2$ in feed
L/D = the reflux ratio in mols of liquid reflux/mol of distillation vapor;

(c) condensing overhead vapor to produce a liquid at least a portion of which is recycled to the distillation column as reflux; and
   (d) recovering an overhead and bottoms product from said distillation column.

2. The process of claim 1 wherein said gaseous mixture comprises sufficient hydrogen to yield a value of $Y_{H2}$ which is greater than about 0.15 but less than about 0.25.

3. The process of claim 1 wherein the pressure in the upper portion of said distillation column is within the range from about 1025 psia to about 1070 psia.

4. The process of claim 1 wherein the feed is introduced at a temperature within the range from about −45° F. to about −70° F.

5. The process of claim 1 wherein said overhead vapor product contains from about 5 to about 1 mole percent carbon dioxide, or lower.

6. The process of claim 1 wherein L/D is at least about 1.25:1.

7. The process of claim 1 wherein L/D is at least 1.3:1.

8. A process for the separation of carbon dioxide from a gaseous mixture comprising carbon dioxide, carbon monoxide, from about 30 to about 85 mol percent methane and sufficient hydrogen to yield from about 6 to about 34.5 mole percent hydrogen in the gas phase at all points in a distillation column above the point or points at which the gaseous mixture is introduced thereto comprising:

(a) introducing said gaseous mixture into a distillation column at a temperature below about −45° F. but at a temperature above that at which solid carbon dioxide would be formed;
   (b) maintaining a temperature within the range from about −170° F. to about −70° F. in the upper portion of said distillation column, the total pressure within said column being greater than the value determined from the following equation:

$$P_T > \frac{705 \text{ psia}}{\left[\frac{Z_{CH4} + (\frac{L}{D})(Z_{CH4} + Z_{H2} + Z_{CO})}{(1 + \frac{L}{D})(Z_{CH4} + Z_{H2} + Z_{CO})}\right]}$$

wherein:
$Z_{CH4}$ = mol fraction of methane in feed
$Z_{H2}$ = mol fraction of hydrogen in feed
$Z_{CO}$ = mol fraction of CO in feed and
L/D = the reflux ratio in mols of liquid reflux/mol of distillation vapor;
but less than 1073 psia or the value determined from the following equation, whichever is lesser;

$$P_T < (673 + 488 Y_{H2} + 11{,}280 Y_{H2}^2) \text{psia}$$

wherein:

$$Y_{H2} = \frac{Z_{H2}}{(1 + \frac{L}{D})(Z_{CH4} + Z_{H2} + Z_{CO})}$$

$Z_{CH4}$ = mol fraction of methane in feed
$Z_{H2}$ = mol fraction of hydrogen in feed
$Z_{CO}$ = mol fraction of CO in feed
L/D = the reflux ratio in mols of liquid reflux/mol of distillation vapor;

(c) condensing overhead vapor to produce a liquid at least a portion of which is recycled to the distillation column as a reflux; and
   (d) recovering an overhead and bottoms product from said distillation column.

9. A process for the separation of carbon dioxide from a gaseous mixture comprising carbon dioxide, nitrogen, from about 30 to about 85 mole percent methane and sufficient hydrogen to yield from about 6 to about 34.5 mole percent hydrogen in the gas phase at all points in a distillation column above the point or points at which the gaseous mixture is introduced thereto, comprising:

(a) introducing said gaseous mixture into a distillation column at a temperature below about −45° F. but at a temperature above that at which solid carbon dioxide would be formed;

(b) maintaining a temperature within the range from about −170° F. to about −70° F. in the upper portion of said distillation column, the total pressure within said column being greater than the value determined from the following equation:

$$P_T > \frac{705 \text{ psia}}{\left[\dfrac{Z_{CH4} + (\frac{L}{D})(Z_{CH4} + Z_{H2} + Z_{N2})}{(1 + \frac{L}{D})(Z_{CH4} + Z_{H2} + Z_{N2})}\right]}$$

wherein
$Z_{CH4}$ = mol fraction of methane in feed
$Z_{H2}$ = mol fraction of hydrogen in feed
$Z_{N2}$ = mole fraction of $N_2$ in feed and
L/D = the reflux ratio in mols of liquid reflux/mol of distillation vapor;

but less than 1073 psia or the value determined from the following equation, whichever is lesser;

$$P_T < (673 + 488 Y_{H2} + 11{,}280 Y_{H2}^2) \text{psia}$$

wherein:

$$Y_{H2} = \frac{Z_{H2}}{(1 + \frac{L}{D})(Z_{CH4} + Z_{H2} + Z_{N2})}$$

$Z_{CH4}$ = mol fraction of methane in feed
$Z_{H2}$ = mol fraction of hydrogen in feed
$Z_{N2}$ = mol fraction of $N_2$ in feed
L/D = the reflux ratio in mols of liquid reflux/mol of distillation vapor;

(c) condensing overhead vapor to produce a liquid at least a portion of which is recycled to the distillation column as reflux; and (d) recovering an overhead and bottoms product from said distillation column.

10. A process for the separation of carbon dioxide from a gaseous mixture comprising carbon dioxide, from about 30 to about 85 mole percent methane and sufficient hydrogen to yield from about 6 to about 34.5 mole percent hydrogen in the gas phase at all points in a distillation column above the point or points at which the gaseous mixture is introduced thereto, comprising:

(a) introducing said gaseous mixture into a distillation column at a temperature below about −45° F. but at a temperature above that at which solid carbon dioxide would be formed;

(b) maintaining a temperature within the range from about −170° F. to about −70° F. in the upper portion of said distillation column, the total pressure within said column being greater than the value determined from the following equation:

$$P_T > \frac{705 \text{ psia}}{\left[\dfrac{Z_{CH4} + (\frac{L}{D})(Z_{CH4} + Z_{H2})}{(1 + \frac{L}{D})(Z_{CH4} + Z_{H2})}\right]}$$

wherein:
$Z_{CH4}$ = mol fraction of methane in feed
$Z_{H2}$ = mol fraction of hydrogen in feed and
L/D = the reflux ratio in mols of liquid reflux/mol of distillation vapor;

but less than 1073 psia or the value determined from the following equation, whichever is lesser;

$$P_T < (673 + 488 Y_{H2} + 11{,}280 Y_{H2}^2) \text{psia}$$

wherein:

$$Y_{H2} = \frac{Z_{H2}}{(1 + \frac{L}{D})(Z_{CH4} + Z_{H2})}$$

$Z_{CH4}$ = mol fraction of methane in feed
$Z_{H2}$ = mol fraction of hydrogen in feed
L/D = the reflux ratio in mols of liquid reflux/mol of distillation vapor;

(c) condensing overhead vapor to produce a liquid at least a portion of which is recycled to the distillation column as reflux; and (d) recovering an overhead and bottoms product from said distillation column.

* * * * *